US009239130B1

(12) United States Patent
Smiley

(10) Patent No.: US 9,239,130 B1
(45) Date of Patent: Jan. 19, 2016

(54) SUPPORT HANGER FOR WORM DRIVE SAW

(71) Applicant: John P. Smiley, Watsonville, CA (US)

(72) Inventor: John P. Smiley, Watsonville, CA (US)

(*) Notice: Subject to any disclaimer, the term of this patent is extended or adjusted under 35 U.S.C. 154(b) by 0 days.

(21) Appl. No.: 14/292,852

(22) Filed: May 31, 2014

(51) Int. Cl.

| | |
|---|---|
| ***A47H 1/10*** | (2006.01) |
| ***F16M 13/02*** | (2006.01) |
| ***B27G 19/02*** | (2006.01) |
| ***B25H 1/00*** | (2006.01) |

(52) U.S. Cl.
CPC ................. *F16M 13/02* (2013.01); *B25H 1/00* (2013.01); *B27G 19/02* (2013.01)

(58) Field of Classification Search
CPC .......... B23D 59/007; B25H 1/04; B25H 1/00; B25H 3/00; B25H 1/06; F16M 13/02; B27G 19/02
See application file for complete search history.

(56) References Cited

U.S. PATENT DOCUMENTS

| | | | | |
|---|---|---|---|---|
| 3,876,078 A * | 4/1975 | Gomes et al. | ................... | 211/64 |
| 4,248,412 A * | 2/1981 | DeRoy | .......................... | 269/102 |
| 5,078,353 A * | 1/1992 | Linn | ............................ | 248/166 |
| 5,205,422 A * | 4/1993 | Morris | ......................... | 211/70.6 |
| 5,833,185 A * | 11/1998 | Bradley | ................... | 248/220.21 |
| 6,648,152 B2 * | 11/2003 | Bermes | ........................ | 211/70.6 |
| 6,702,240 B1 * | 3/2004 | Bradley | ........................ | 248/301 |
| 2015/0060637 A1 * | 3/2015 | Hylden | ......................... | 248/674 |

* cited by examiner

*Primary Examiner* — Amy Sterling
(74) *Attorney, Agent, or Firm* — Richard A. Ryan

(57) ABSTRACT

An apparatus for supporting a worm drive saw in a hanging position from a beam of a support structure, such as a sawhorse. The support hanger comprises a beam attachment section for engaging an end of the beam and a saw support section, attached to or integral with the beam attachment section, for supporting the saw in a position that allows the user of the saw to easily, safely and quickly place the saw in or remove the saw from the support hanger. The beam attachment section has an insert component which is received in a slot in the beam and a pair of spaced apart side walls that define a beam opening which receives a portion of the beam therein. The saw support section comprises a handle engaging member for receiving and supporting a top handle of the saw and saw plates against which the saw leans.

19 Claims, 6 Drawing Sheets

SUPPORT HANGER FOR WORM DRIVE SAW

BACKGROUND OF THE INVENTION

A. Field of the Invention

The present invention relates generally to apparatuses for supporting a tool when the tool is not in use. More particularly, the present invention relates to such apparatuses that are configured to safely and securely support a sawing type tool above the ground to reduce the likelihood of damage to the tool and injury to persons. Even more particularly, the present invention relates to such apparatuses that are configured to support a worm drive saw and the like.

B. Background

As is well known, construction work of any kind requires a relatively large number of tools to accomplish the desired construction objective. This is true whether the construction project involves building a large scale multi-story building, factory, house, road, dam or the like or a relatively small, or even very small scale home remodeling or improvement type of project. Commonly utilized construction tools include such general items as hammers, saws, screwdrivers, drills, wrenches, chisels and the like. Many of these tools are motorized, with the motor being electrically (wire or battery), pneumatically or even hydraulically powered to better accomplish the intended tasks. Naturally, the powered tools are generally more dangerous to operate and use. As is also well known, many of the tools utilized by construction workers are manufactured to accomplish one or more specific tasks in an as easy, safe and efficient manner as possible in light of the inherent danger of using the tool. In addition to tools, construction workers utilize a number of specially configured apparatuses that support the tools the workers use, support the materials that will be worked on by the tools and/or support the materials while the construction user is working on the material to modify it as desired or needed to accomplish the construction objective.

One of the most commonly utilized tools for any construction site is a powered saw, typically an electrically powered saw that connects to a source of electrical power at a wall outlet or generator, usually by way of an extension cord, or which supports one or more attached batteries, usually in the form of a battery pack that removably attaches to the saw. Although there is a wide variety of such saws available, perhaps the most commonly utilized powered saws are circular saws. The most commonly available types of circular saws are those which are referred to as direct drive saws and the worm drive saws. Although both type of saws rotate a circular configured saw blade, the way in which the motor connects to and operatively rotates the saw blade is different. For direct drive saws, the shaft that connects the motor to the saw blade runs directly out of the motor to rotate the saw blade. In contrast, worm drive saws have the motor mounted to the side and rear of the tool with a worm gear that interconnects the motor and the saw blade. The motor shaft turns the worm gear that transmits power to the saw blade. The configuration of the worm drive saw substantially reduces the likelihood that minor binding will stop the motor and allows the worm drive saw to be used for much more "substantial" cutting work. A variety of manufacturers make one or both of these saws.

Most worm drive saws have an electrically powered motor that, due in part to the loading on the motor, is connected to a power cord that connects the motor to a source of power. To assist the user with holding and utilizing the worm drive saw, the slightly elongated saw body has a pair of handles securely attached thereto. One handle is disposed generally on the top side of the saw and one is disposed generally in the rearward portion of the saw. Typically, the user grasps a handle in each hand when using the saw to cut material, typically wood. When the worm drive saw is not being used to cut material, many users either place the saw on the ground (a blade guard protects the saw blade) or hangs the saw from one of the handles. Despite the blade guard, care must be taken by the user when he or she is handling, positioning and storing (such as by hanging) the saw when the saw is not in use. Dropping the saw on the ground, concrete, asphalt or other surface or placing it where it can fall on the surface is likely to damage the saw body and/or the saw blade. Damage to the saw body can cause the motor and/or worm drive gear to not operate properly, which often results in loss of the saw. In addition, if the worm drive saw is not safely stored it can be in a position to hurt someone walking or kneeling by the saw if he or she comes into contact with the saw.

One challenge for most users is where to put the saw when he or she is between using the saw to cut on the material, such as when the material is being measured, positioned for cutting or removed after cutting so another piece of material can be placed in position to be cut. Because a typical job site will have a number of workers working on different projects and a variety of different tools being used by these workers, there is generally more people traffic in the area where the user may be cutting material with the saw. This makes proper, safe placement of the worm drive saw even more important and generally somewhat more difficult. Though not recommended, many people place the worm drive saw on the ground or on a pile of wood, bricks or other materials while not in use. Unfortunately, as will be readily appreciated by those skilled in the art, the worm drive saw can easily get dirty or damaged by the movement of people and/or machines in the area where the saw is placed.

As set forth above, most construction work requires the use of one or more apparatuses that support the tools the workers use, support the materials that will be worked on by the tools and/or support the materials while the worker is working on the material to modify it as desired or needed to accomplish the construction objective. With regard to the use of worm drive saws, apparatuses are required to support the wood or other material that is being cut by the saw. Perhaps the most commonly utilized type of support apparatus is a sawhorse, which is usually utilized in pairs (or more) to support the material being cut by the worm drive saw. The typical sawhorse has a generally horizontally disposed elongated beam having a pair of legs at or near each end of the beam, with each pair of legs typically formed in an inverted v-shape to support the beam at or near the top of the two legs. If properly configured, a pair of sawhorses can safely support a length of material, typically in the form of a sheet, while it is cut or otherwise worked on by the construction worker. Although sawhorses can be made out of a wide range of materials, most sawhorses are made out of wood, often utilizing a 2×4 or 2×6 for the beam and 2×4s for the legs. Often each pair of legs of a sawhorse has a transversely disposed bracket or other member to help support the legs, and therefore the sawhorse itself, in an upright position. Often this bracket or other member is configured to selectively allow the legs to collapse for ease of transporting or storing the sawhorse.

When utilizing a sawhorse to support material as it is being cut by a worm drive saw, most workers prefer to hang the saw from the sawhorse so the saw does not need to be placed on the ground or on a pile of materials and so the saw will be readily accessible to the user when he or she is ready to utilize the saw to cut the material being supported by the sawhorse. To hang the worm drive saw from the sawhorse, many people drive a nail into one of the wooden members of the sawhorse and hang the saw from the nail. Alternatively, some people attach a hook to one of the beam or leg members or fashion a hook from on of those members to hang the saw. These are usually temporary, makeshift solutions to the problem of where to place the worm drive saw when it is not in use to cut material. Unfortunately, the saw can be relatively easily bumped or otherwise knocked off of the support nail or hook and fall to the ground, floor or other support surface on which the sawhorse stands, which can cause damage to the saw and/or the surface.

What is needed, therefore, is an improved apparatus for supporting a worm drive saw when the saw is not being utilized to cut material. Preferably, an improved saw support apparatus would be configured to allow a user to hang a worm drive saw from a sawhorse, or similarly configured support apparatus, that is also being used to support the material that is to be cut by the worm drive saw, in a manner which allows the user easy access to the saw and which reduces the likelihood the saw will be damaged by contact with other persons or machines or by a fall onto a surface. Such an apparatus should be configured to allow the user to safely, easily and quickly hang the saw from the apparatus when the saw is not needed, such as when positioning or measuring the material to be cut, and to safely, easily and quickly retrieve the saw from the apparatus when the saw is needed to cut the material supported by the sawhorse.

SUMMARY OF THE INVENTION

The support hanger for worm drive saws of the present invention solves the problems and provides the benefits identified above. That is to say, the present patent application discloses a support hanger which is structured and arranged to support a worm drive saw from a beam, such as the beam of a sawhorse or a similarly configured support structure. More specifically, the support hanger of the present invention safely and securely supports a worm drive saw from the beam of a sawhorse when the saw is not being utilized to cut material. As such, the support hanger of the present invention allows the user to safely store a worm drive saw while he or she is busy doing other tasks, such as positioning or measuring the material to be cut by the saw. The new support hanger for worm drive saws is configured to hang the saw from the beam of a sawhorse, or other beam, in a manner which allows the user to safely, easily and quickly place the saw on the support hanger when the saw is not needed to cut material and to safely, easily and quickly retrieve the saw therefrom when the user needs to use the saw to cut the material. The support hanger of the present invention allows the user to safely store a worm drive saw while he or she is performing other tasks, such as those that may be related to using the saw to cut the material and tasks which are not related to cutting the material. The support hanger of the present invention supports a worm drive saw from the beam of a sawhorse in a manner that reduces the likelihood that the saw will get dirty or be damaged by contact with persons or machines or be damaged by a fall onto a surface, such as the ground or floor on which the sawhorse is supported.

In one aspect of the present invention, the support hanger generally comprises a beam attachment section sized and configured to be engagedly positioned at an end of the beam of a support structure, such as a sawhorse or the like, and a saw support section that is attached to or integral with the beam attachment section for removably supporting a worm drive saw. The beam attachment section has an upper end, a lower end and a beam opening disposed between the upper end and the lower end thereof. The upper end of the beam attachment section has an insert component which is sized and configured to be received in a slot at the end of the beam so as to position a portion of the beam (i.e., the portion below the slot) in the beam opening. The saw support section comprises an elongated support member having an upper end and a lower end, a top plate at the upper end of the support member, a handle engaging member disposed between the upper end and the lower end of the support member and one or more saw plates at or near the lower end of the support member. The top plate of the support member is attached to or integral with the lower end of the beam attachment section. The handle engaging member extends outward from the support member and is sized and configured to be supportedly engaged by a top handle of the saw. Each of the saw plates are sized and configured to abuttingly engage the saw (i.e., with the saw leaning against the saw plates) so as to removably support the saw in its hanging position generally below the beam of the support structure with a rearward handle of the saw facing outwardly from the support hanger for ease of placement on or removal from the support hanger. In effect, the user places and removes the saw in much the same manner that a person would place or remove a pistol from a holster. In a preferred embodiment, the beam attachment section has a first side plate, a second side plate in spaced apart relation to the first side plate and a stop component that is attached to or integral with the first side plate, second side plate and/or insert component. The stop component is sized and configured to abut an end surface at the end of the beam to prevent movement of the beam attachment section away from the end of the beam.

Accordingly, the primary aspect of the present invention is to provide a support hanger for worm drive saws that has the advantages set forth above and elsewhere in the present disclosure and which overcomes the disadvantages and limitations associated with presently available apparatuses for supporting a worm drive saw when it is not in use.

It is an important aspect of the present invention to provide a support hanger that is specifically configured to removably, but safely, support a worm drive saw from the beam of a sawhorse, or similarly configured beam, that is being utilized to support material that will be cut with the saw.

It is also an important aspect of the present invention to provide a support hanger that can be utilized to support a worm drive saw in a manner which allows the user to safely, quickly and easily place the saw on the hanger so it is out of the way while he or she manipulates or measures the material to be cut and then to safely, quickly and easily retrieve the saw when he or she is ready to cut the material with the saw.

It is also an important aspect of the present invention to provide a support hanger for worm drive saws that can be utilized with a wide variety of different sized beams, but specially the beam of a sawhorse, to safely support a worm drive saw in a manner that allows the user thereof to conveniently hang the saw when not in use and then to retrieve the saw to cut the material that is being supported by the beam.

It is also an important aspect of the present invention to provide a support hanger for worm drive saws that can be made from a wide variety of different materials, in a variety of different sizes and be relatively inexpensively manufactured so as to be widely available to persons who utilize such saws.

As will be explained in greater detail by reference to the attached figures and the description of the preferred embodiment which follows, the above and other aspects are provided or accomplished by the present invention. As set forth herein, and as widely known in the art, the present invention resides in the novel features of its form, construction, mode of operation and combination of processes presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed text and drawings are merely illustrative of preferred embodiments and only represent several possible ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description set forth herein show and describe one type of sawhorse and worm drive saw, persons skilled in the art will readily understand that this is merely for purposes of simplifying the present disclosure and that the present invention is not so limited. For instance, the support hanger of the present invention can be utilized with differently configured support structures and worm drive saws.

Figure 1:
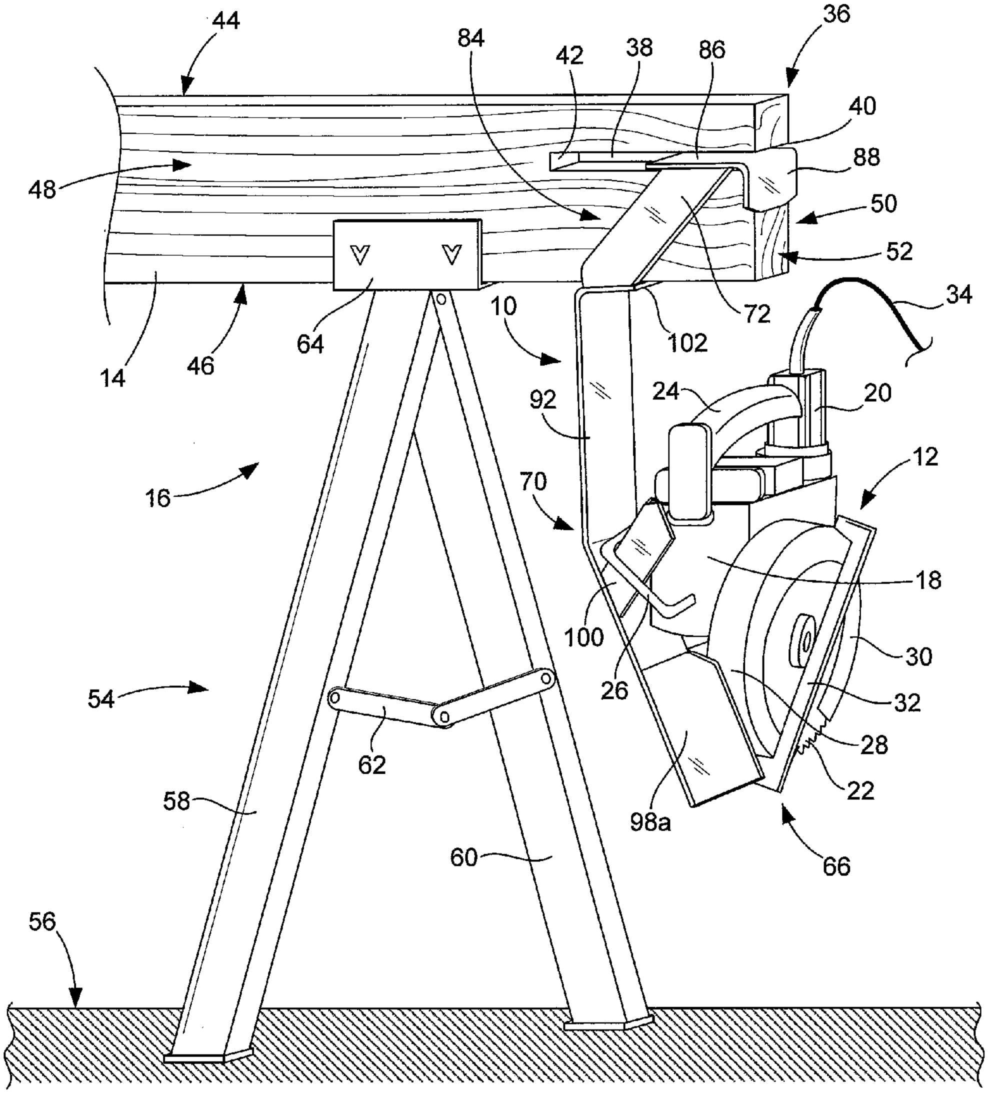
FIG. 1 is a side perspective view of a support hanger that is configured according to a preferred embodiment of the present invention, with the support hanger shown removably supported at one end of a sawhorse and in use hanging a worm drive saw therefrom.

A support hanger that is made from the components and which is configured pursuant to various embodiments of the present invention is referred to as 10 in FIGS. 1-8. As shown in FIG. 1, the support hanger 10 of the present invention is structured and arranged to safely and conveniently hang a worm drive saw 12 from a beam 14 of a support structure 16, such as the sawhorse shown in FIGS. 1 and 2. In the preferred embodiment of the present invention, the support hanger 10 is configured to allow the user of a worm drive saw 12 to safely place the saw 12 on the support hanger 10 when he or she is not using the saw 10 to cut wood or other materials, which will typically be cut while being supported by the sawhorse 16, and to be able to quickly, easily and safely remove the saw 12 from the support hanger 10 so he or she can use the saw 12 to cut the material. As generally well known in the art, many users of a worm drive saw 12 utilize one or more sawhorses 16, usually a pair of sawhorses 16, to support the material while the material is being cut with the saw 12. When the material is being cut, the user holds the saw 12 with both hands to guide the saw across the material along a line designating where the material is to be cut. Prior to using the saw 12 to cut the material, the user will move the material onto the sawhorse 16 and position the material on the sawhorse 16 to most safely and efficiently cut the material. Either before or after moving and/or positioning the material on the sawhorse 16, the user will typically measure and draw a line or other marking on the material to designate where the material is to be cut.

A typical worm drive saw 12, an example of which is shown in FIG. 1, comprises a housing 18 enclosing a motor 20 that is rotatably connected to a circular saw blade 22 so as to rotate the blade 22 and cut the material along a path controlled by the user. To facilitate this control, the typical worm drive saw 12 has a first or rearward handle 24, typically configured as a pistol grip type of handle, at the back side of the housing 18 and a second or top handle 26 at the top side of the housing 18. To protect the user while using saw 12, the typical worm drive saw 12 has one or more saw guards, such as an upper blade guard 28 and a lower blade guard 30. When in use, a base or guide plate 32 is placed in abutting relation to the material being cut such that the bottom surface of the guide plate 32 slides along the surface of the material, with the saw blade 22 cutting the material inward of the guide plate 32. Most worm drive saws 12 are electrically connected to a source of power, such as at a wall plate or generator, by a power cord 34 that generally extends out the rear of the saw 12, as shown with regard to the exemplary saw 12 shown in FIG. 1.

Figure 2:
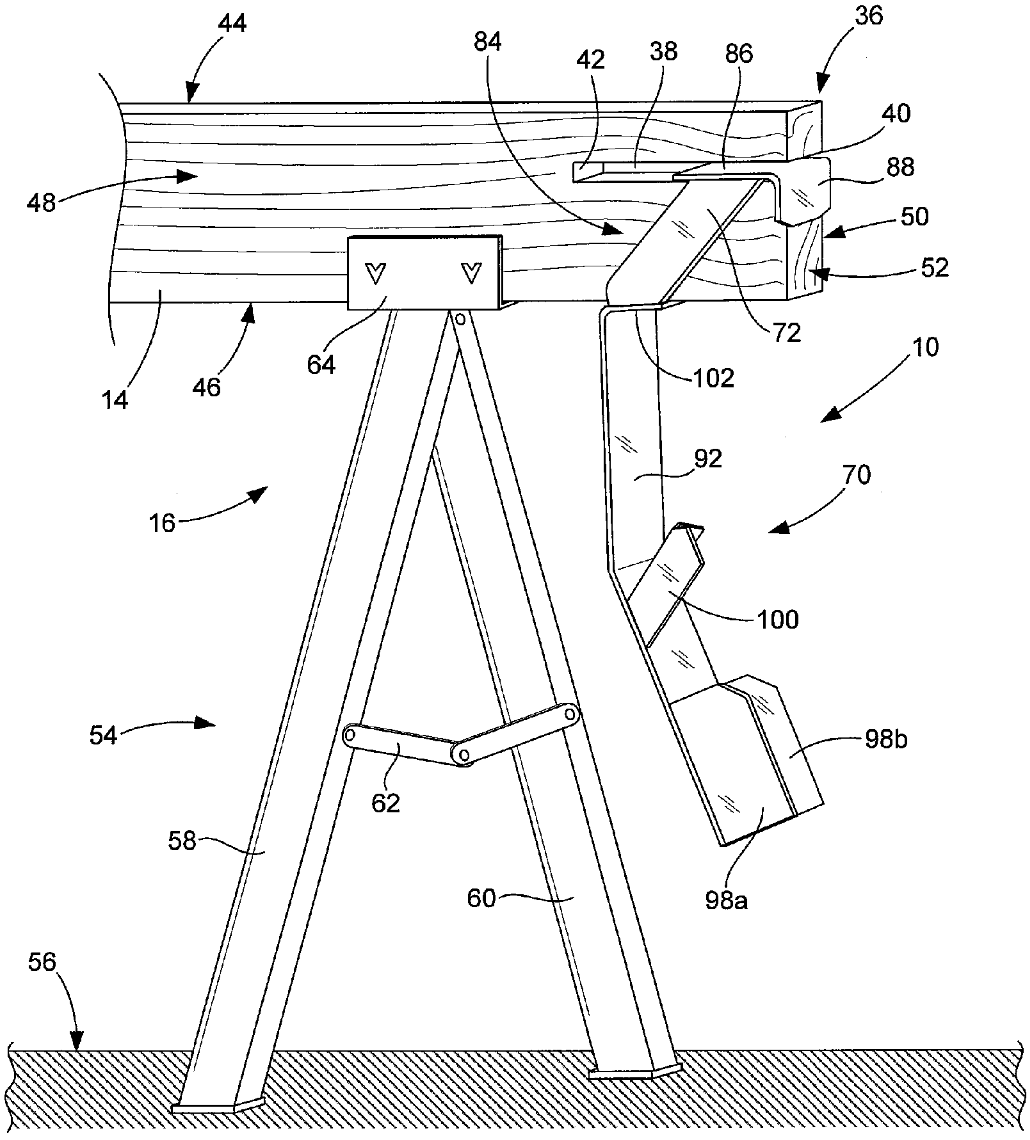
FIG. 2 is a side perspective view of the support hanger of FIG. 1 shown removably supported on the sawhorse without the worm drive saw to better illustrate the features of the support hanger of the present invention.

As stated above, the support hanger 10 of the present invention is typically utilized with a support structure (most often a sawhorse) 16 having an elongated, generally horizontally disposed beam or beam like member 14. As explained in more detail below, one end 36 of the beam 14 is modified by adding a generally horizontally disposed slot 38 having a proximal end 40 at the end 36 of the beam 14 and an inwardly disposed distal end 42, as shown in FIGS. 1 and 2. As also shown in these figures, the beam 14 has a top surface 44, bottom surface 46, first side surface 48, second side surface 50 and an end surface 52. The beam 14 has a width, shown as BW in FIGS. 1 and 2, between the first side surface 48 and second side surface 50. Although the beam 14 may be of any size or shape, most sawhorses 16 utilize a 2×4, 2×6, 2×8 or 2×10 wood member, which are commonly available at most lumber or hardware stores. The nominal beam width BW for the above-identified sizes is two inches, but more accurately closer to one and one-half inches. As set forth in more detail below, it will be readily apparent to persons skilled in the art that the present invention is not limited to use with the typical or standard sizes of beam 14 for sawhorses 16.

To be utilized for supporting wood or other materials as it is cut by the worm drive saw 12, the beam 14 must be supported by the support structure 16 in a manner that allows the user to press downward on the material to hold the material in place as he or she cuts it with the saw 12. In certain circumstances, the beam 14 may extend outwardly from a variety of different support structures in a manner that allows use of the beam 14 to cut the material. In the figures, the support structure 16 is a sawhorse. A typical sawhorse 16 has a leg support 54 at or near the end 36 of the beam 14 and a second leg support (not shown) at the opposite end (also not shown) of the beam 14 that supports the sawhorse 16 in spaced apart relation above the ground, floor, deck or other support surface 56. The leg supports, including leg support 54, are structured and arranged to at least generally horizontally dispose the top surface 44 of the beam 14 relative to the support surface 56. Although a variety of different configurations may be utilized for leg support 54, a typical configuration for sawhorse 16 comprises a first leg member 58 and a second leg member 60 that are arranged in an inverted v-shape with the apex of the "v" being at or near the bottom surface 46 of beam 14, as shown in FIGS. 1 and 2. Typically, but not exclusively, the leg support 54 will include one or more laterally disposed cross-members 62 that are utilized to stabilize the leg support 54 and maintain the beam 14 in at least a substantially horizontal position. The cross-member 62 may be configured to allow the leg support 54 to move between an open position (as shown) for use to support material and a closed position (not shown) to facilitate easier transport and storage of the saw-horse 16. Often the top end of the leg members 58/60 are directly attached to the beam 14 using nails, screws, bolts or other connecting elements. Alternatively, as shown in FIGS. 1 and 2, a bracket 64 will be utilized to connect the leg members 58/60 to the beam 14.

Typically, as set forth in the Background, the user of the worm drive saw 12 will hang the saw 12 from the sawhorse 16, or like configured support structure, by driving a nail or attaching a hook to the beam 14 and/or the leg support 54 or lay the saw 12 on the ground or other support surface 56. While use of a nail, hook or other device to hang the saw 12 from generally works with regard to keeping the saw 12 off of the ground 56, it is well known by those skilled in the art that hanging the saw 12 from a nail, hook or like device has significant disadvantages with regard to the saw 12 being in the way and/or being relatively easily knocked off the device and falling on the ground 56, which can damage the saw 12 and, in certain circumstances (i.e., tile floor, etc.), the support surface 56 itself. Placing the saw 12 on the ground or other support surface 56 can result in dirt, water, mud or other undesirable material damaging the saw 12 or the saw 12 being damaged by being stepped on by a person (which can also result in injury to the person) or being run over with a machine. As set forth in more detail below, the support hanger 10 of the present invention eliminates the problems associated with use of a nail, hook or other prior art device and the damage and injury issues with regard to placing the saw 12 on the ground 56.

The support hanger 10 of the present invention is structured and arranged to hang the worm drive saw 12 in a hanging position 66 below the beam 14 of the sawhorse 16 such that the saw 12 is positioned in spaced apart relation to the ground or other support surface 56 on which the sawhorse 16 rests, as shown in FIGS. 1 and 2. The support hanger 10 supports the saw 12 in the hanging position 66 in a manner that substantially eliminates the likelihood that the saw 12 will be knocked off the sawhorse or other support structure 16 and onto the ground 56. The support hanger 10 also eliminates the need to place the saw 12 on the ground 56. When the saw 12 is placed in the support hanger 10 of the present invention, the saw 12 will be substantially out of the user's way and reduce the likelihood the user will run into the saw 12 or trip over the power cord 34, particularly while he or she is placing, maneuvering or measuring the wood or other material that is to be cut by the saw 12. As set forth in more detail below, the support hanger 10 of the present invention supports the saw 12 in its hanging position 66 in a generally upright position which allows the user to quickly, easily and safely place the saw 12 on the support hanger 10 when not needed to cut the material and to quickly, easily and safely remove the saw 12 from support hanger 10 when the saw 12 is needed to cut the material. As will be readily appreciated by those skilled in the art, use of the support hanger 10 to support saw 12 is much like a placing and removing a pistol from its holster.

The support hanger 10 of the present invention generally comprises a beam attachment section 68 that removably attaches the support hanger 10 to the beam 14 and a saw support section 70 that is attached to or integrally formed with the beam attachment section 68 and structured and arranged to removably support the worm drive saw 12 in a manner which allows the user to safely, easily and quickly position the saw 12 on and remove the saw 12 from support hanger 10. In the preferred embodiment, the beam attachment section 68 is structured and arranged to securely and somewhat rigidly attach the support hanger 10 to the end 36 of the beam 14 of the support structure 16 (i.e., sawhorse), as shown in FIGS. 1 and 2, by substantially enveloping around the end 36 so as to support the saw 12 in its hanging position 66. Preferably, once placed on the end 36 of the beam 14, the support hanger 10 will be in as stable a condition as possible so as to reduce the likelihood the saw 12 will fall or be knocked to the ground or other support surface 56.

Figure 3:
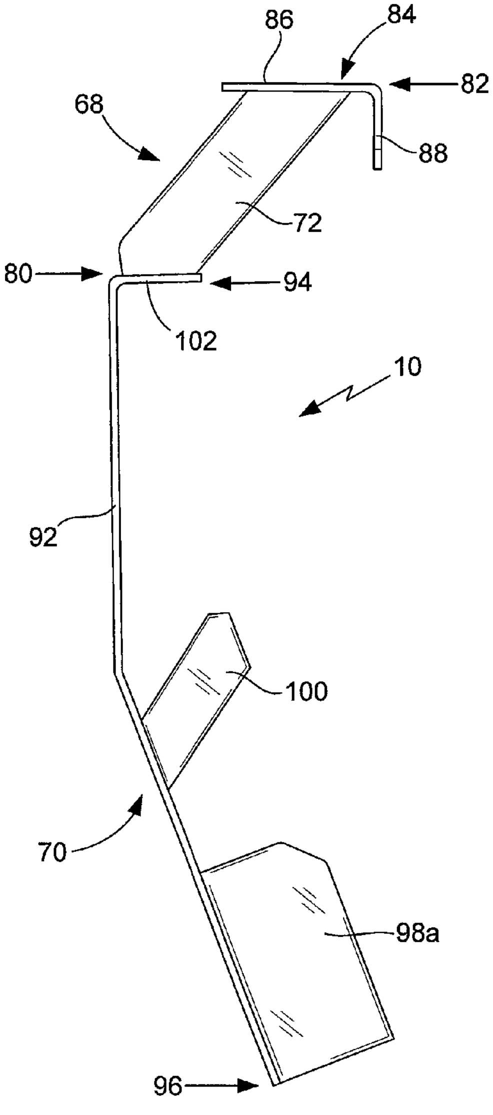
FIG. 3 is a left side view of the support hanger of FIG. 2.
Figure 4:
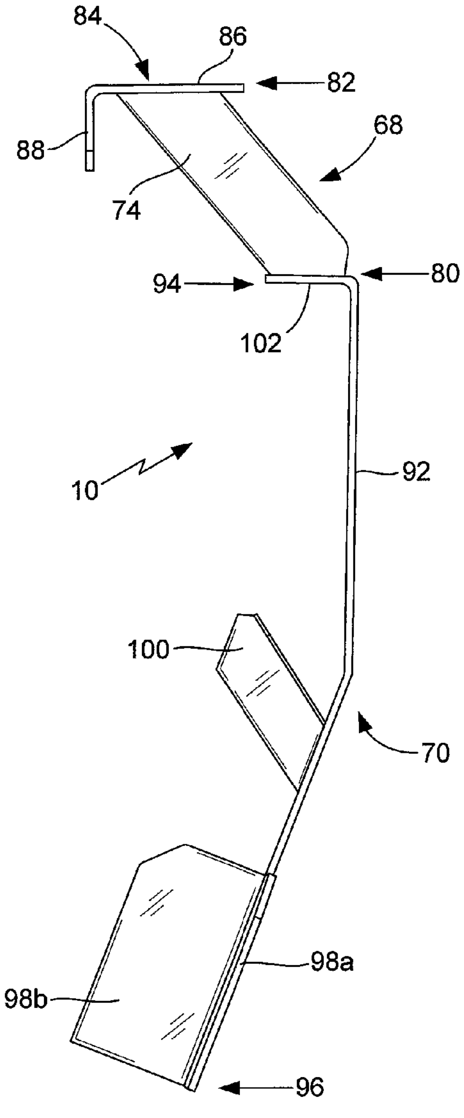
FIG. 4 is a right side view of the support hanger of FIG. 2.
Figure 5:
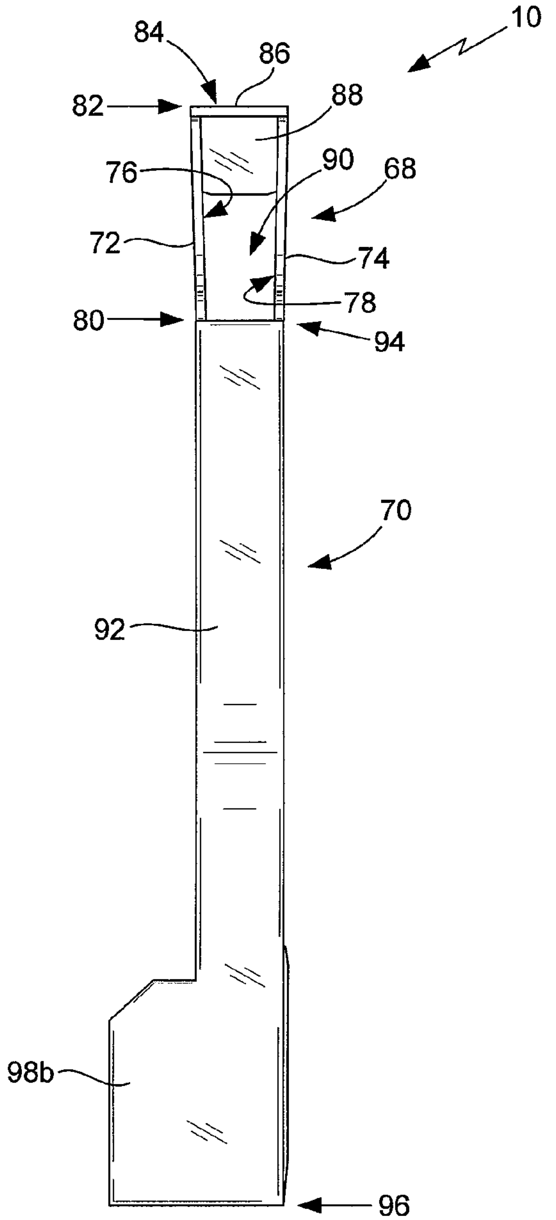
FIG. 5 is a front view of the support hanger of FIG. 2.
Figure 6:
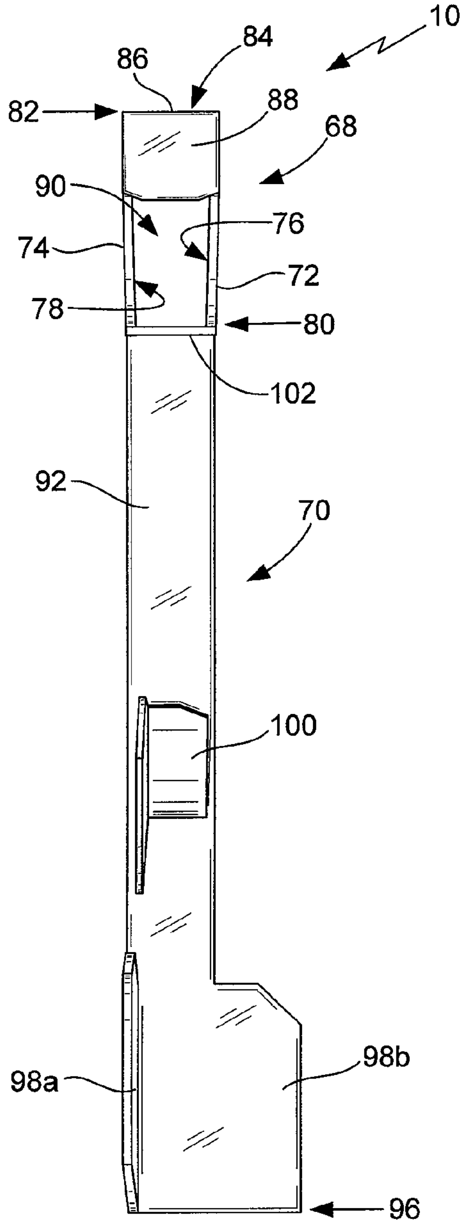
FIG. 6 is a back view of the support hanger of FIG. 2.
Figure 7:
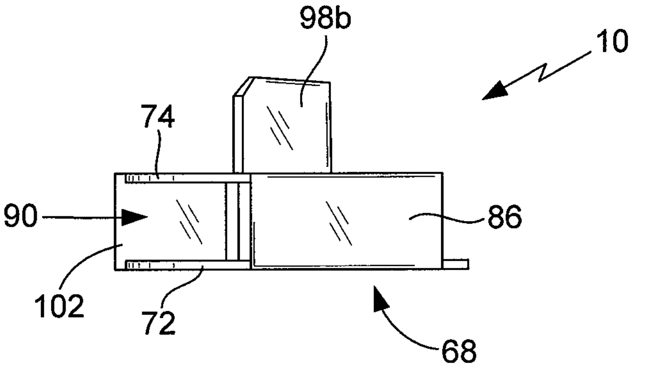
FIG. 7 is a top plan view of the support hanger of FIG. 2.
Figure 8:
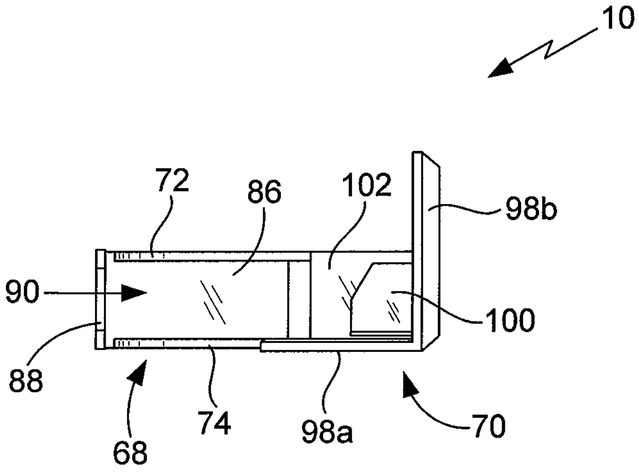
FIG. 8 is a bottom plan view of the support hanger of FIG. 2.
Figure 9:
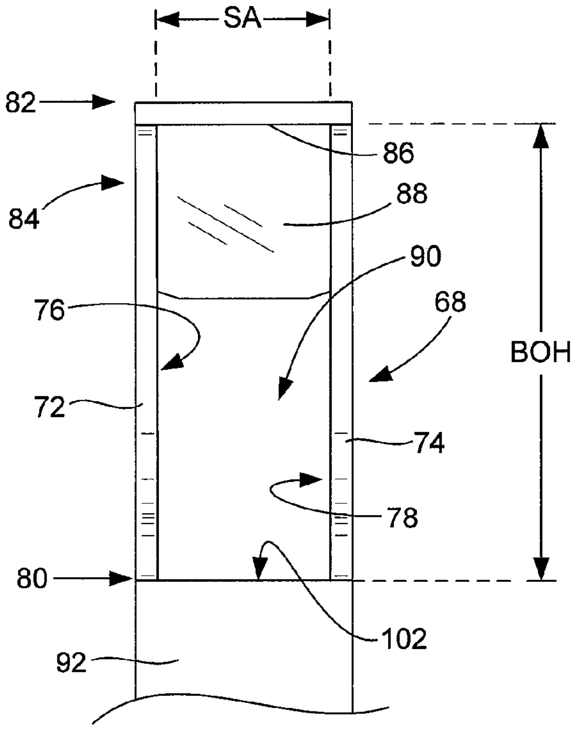
FIG. 9 is an isolated front view of the beam attachment section of the support hanger of FIG. 2.
Figure 10:
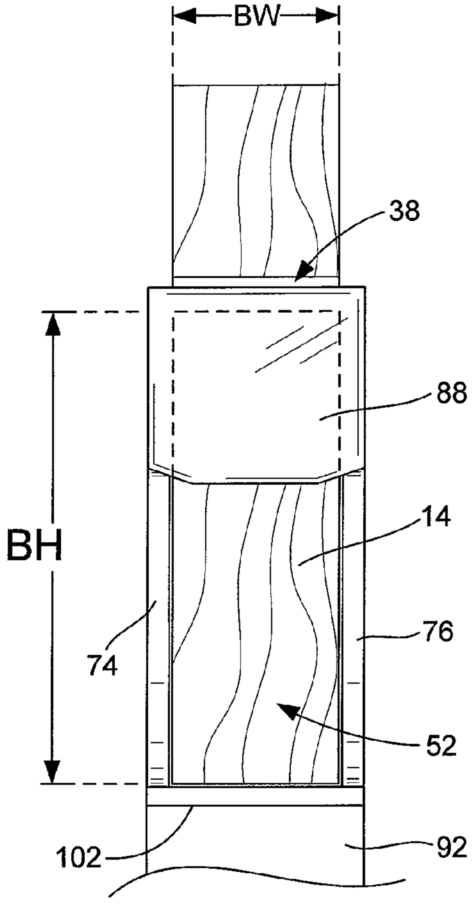
FIG. 10 is an isolated back view of the beam attachment section of the support hanger and beam of FIG. 1.

As best shown in FIGS. 3-8, the beam attachment section 68 of the embodiment shown in the figures comprises a pair of side plates, namely first side plate 72 and second side plate 74, that are disposed in spaced apart relation to each other so as to define a spacing amount SA between the inside surfaces, shown as first inside surface 76 and second inside surface 78 in FIGS. 5-6 and 9, of the side plates 72/74. In the preferred embodiment, the spacing amount SA is slightly larger than, but substantially equal to, the beam width BW of the beam 14 of the sawhorse 16 so the beam attachment section 68 can slide onto the end 36 of the beam 14, as shown in FIGS. 1-2 and 10, and be removed therefrom when use of the support hanger 10 is not needed. Preferably, the spacing amount SA between the inside surfaces 76/78 of side plates 72/74 should be selected such that the inside surfaces 76/78 are in at least substantially abutting relation to, respectively, the first side surface 48 and the second side surface 50 of the beam 14. The lower end 80 of the beam attachment section 68 of support hanger 10 is attached to or integral with saw support section 70, as best shown in FIGS. 3-6 and 7-8. In one embodiment, depending on the materials that are utilized for the respective components, the bottom of the side plates 72/74 are welded to the saw support section 70 to form the lower end 80 of the beam attachment section 68. The upper end 82 of beam attachment section 68 has a beam engagement member 84 that is sized and configured to be slidably inserted into the slot 38 at the end 36 of beam 14, as best shown in FIGS. 1-2. In a preferred embodiment, the beam engagement member 84 is generally L-shaped having a substantially horizontal insert component 86 that fits within the slot 38 and a substantially vertical stop component 88 (though it may be angularly disposed) that is toward the back side of the beam attachment section 68, as best shown in FIGS. 3 and 4, which is configured to abut the end 36 of the beam 14 when support hanger 10 is supportably engaged therewith, as shown in FIGS. 1 and 2. The inside area defined by the side plates 72/74, lower end 80 and insert component 86, referred to herein as the beam opening 90, is sized and configured to receive the end 36 of the beam 14 therein. The width of the beam opening 90 is spacing amount SA and the height of the beam opening 90 is beam opening height BOH. Preferably, the beam opening height BOH is slightly larger than, but substantially equal to, the height of the beam 14 below the slot 38, or beam height BH, of the sawhorse 16 so the beam attachment section 68 can slide onto the end 36 of the beam 14, as shown in FIGS. 1-2 and 8, and be removed therefrom when use of the support hanger 10 is not needed. As such, in a preferred embodiment, beam opening 90 of the support hanger 10 is cooperatively configured with the end 36 of beam 14 and dimensioned so as to be substantially equal in size to, but slightly larger than, the end 36 of the beam 14 below the slot 38, having dimensions beam width BW and beam height BH, so as slide on to and somewhat closely envelope the end 36 of beam 14 at and below the slot 38. This will prevent, or at least substantially reduce, the support hanger 10 from wobbling or otherwise moving around on the beam 14 when support hanger 10 is in use to support the saw 12 in its hanging position 66, as shown in FIG. 1.

The saw support section 70 of support hanger 10 comprises a main or primary, elongated support member 92 having an upper end 94 and a lower end 96, one or more outwardly extending saw plates 98 (shown as first saw plate 98*a* and second saw plate 98*b*) positioned at or near the lower end 96 of the support member 92 and an outwardly extending handle engaging member 100, as best shown in FIGS. 3-8. In one embodiment, saw plates 98*a* and 98*b* are generally planar and are attached to or integral with the support member 92 so as to extend outwardly therefrom, as shown in FIGS. 3-8, to provide a generally flat surface for components of the saw 12 to abut. The handle engaging member 100 can be a generally L-shaped bracket (as shown) or it may have any shape which can beneficially engage the top handle 26 of the saw, including having a square, rectangular, cylindrical or oval cross-section, by having the top handle 26 placed over the handle engaging member 100. A top plate 102 at the upper end 94 of the support member 92 is attached to or integral with the lower end 80 of the beam attachment section 68 so as to define the bottom of the beam opening 90, as best shown in FIGS. 5-6 and 9-10. As shown in FIG. 1 and described in more detail below, one or more components of the saw 12 (i.e., blade guards 28/30 and/or guide plate 32) are placed in abutting relation with the saw plates 98*a* and 98*b* and the top handle 26 of the saw 12 is supportedly engaged by the handle engaging member 100 when support hanger 10 is utilized to removably support the saw 12 on the beam 14 of the sawhorse 16, as best shown in FIG. 1. As set forth above, the components of saw support section 70 are cooperatively sized, configured and positioned so as to safely support the saw 12 on the support hanger 10 and to facilitate the user easily and quickly positioning the saw 12 thereon and easily and quickly removing the saw 12 therefrom.

The support hanger 10 can be manufactured out of a wide variety of different materials and the components thereof can be integrally formed and/or one or more of the components can be fixedly (preferably) attached together. As will be readily appreciated by those skilled in the art, the materials selected for support hanger 10, and the mechanisms to connect the components (if applicable), must be selected to have sufficient strength to support the saw 12 from the beam 14 of the sawhorse or other support structure 16 and be selected so as to withstand the rigors and conditions of a typical work environment where the worm drive saw 12 will or may be utilized. In one embodiment, the support hanger 10 of the present invention is made out of steel and the components are welded together in the shapes and positions described above. Although steel and like materials have the advantage of generally being strong enough to support the saw 12 and to withstand the work environment, such materials are likely to need to be painted, coated, covered or otherwise treated to reduce the likelihood the support hanger 10 will corrode or otherwise be damaged by the environment in which it is utilized. In one embodiment, the support hanger can be powder coated to substantially eliminate corrosion issues. In another embodiment, the support hanger 10 of the present invention can be made out of plastic, composites and like materials using an injection molding process or other processes appropriate for the materials. In such embodiments, it may be preferred to integrally manufacture the components of support hanger 10. Naturally, any such materials also need to have sufficient strength and durability for the intended uses of the support hanger 10.

As set forth above, in a preferred embodiment the support hanger 10 has a beam attachment section 68 that is cooperatively sized and configured with the beam 14 of the support structure 16, such as a sawhorse, with which support hanger 10 will be used to support the worm drive saw 12. Typically, the beam 14 will be a 2×4, 2×6 or 2×8, having a nominal beam width BW of 1.5 inches. The beam height BH, the distance below the slot 38 in the beam 14, will be less than the nominal height of the entire beam 14, which is typically approximately 3.5, 4.5 or 7.5 inches. In a preferred configuration, the beam attachment section 68 will have a spacing amount SA that is only slightly larger than the beam width BW and a beam opening height BOH that is only slightly larger than the beam height BH. In use to support a saw 12 in its hanging position 66, the beam opening 90 of the beam attachment section 68 of the support hanger 10 is positioned at the end 36 of the beam 14 with the insert component 86 aligned with the slot 38 in the beam 14. The beam attachment section 68 is then slid over the end 36 of the beam 14 with the insert component 86 moving into and along the slot 38 until the stop component 88 is in abutting relation with the end surface 52 at the end 36 of the beam 14, as shown in FIGS. 1 and 2. Once the beam attachment section 68 is in place, substantially enveloping the end 36 of the beam 14 below the slot 38 in the beam 14, as shown in FIG. 2, the support hanger 10 is ready for use to support the saw 12 in its hanging position 66.

The user places the saw 12 on the support hanger 10 by holding the saw 12 by its rearward handle 24, moving the saw 12 toward the support hanger 10, positioning the top handle 26 over the handle engaging member 100 and then lowering the saw 12 until components thereof, typically the upper blade guard 28 or the guide plate 32, are in abutting relation with the saw plates 98*a*/98*b*. In one embodiment, the handle engaging member extends generally at an upward angle and is approximately three to six inches in length and the saw plates 98*a*/98*b* generally form a ninety degree angle and saw plates 98*a*/98*b* extend outwardly approximately two to four inches. When the user releases his or her hand from the rearward handle 24, the saw 12 will be supported by the support hanger 10 in its hanging position 66. To remove the saw 12 to cut materials, typically being supported by the sawhorse or other support structure 16, he or she will grab the rearward handle 24, lift the saw 12 generally upward to remove the top handle 26 from the handle engaging member 100 and pull the saw 12 away from support hanger 10. As will be readily appreciated by those skilled in the art, placement of the saw 12 on the support hanger 10 or removing the saw 12 from the support hanger 10 will generally happen quickly and easily. When supported by the support hanger 10, the saw 12 will be protected from being knocked off onto the ground, stepped on or run over by others or equipment, reducing the likelihood the saw 12 will be damaged, people will be injured and/or other equipment will be damaged. As such, the support hanger 10 of the present invention provides a safe, easy to use and generally economical support for worm drive saw 12.

While there are shown and described herein one or more specific embodiments of the present invention, it will be readily apparent to those skilled in the art that the invention is not so limited, but is susceptible to various changes in quantities and materials without departing from the spirit and scope of the invention. The foregoing descriptions of specific embodiments of the present invention have been presented for purposes of illustration and description and are not intended to be exhaustive or to limit the scope of the invention to the precise forms disclosed. The above embodiments were set forth above for the purposes of best illustrating and explaining the principles of the present invention and one or more practical uses thereof so as to enable persons skilled in the art to best understand and utilize the present invention. Persons skilled in the art will readily understand and appreciate that they will be able to utilize the teachings of this disclosure to modify the present invention as may be necessary to suit their specific needs and/or requirements without departing from the spirit or scope of the claims of the present invention.

What is claimed is:

1. A support hanger for removably supporting a saw on a beam of a sawhorse, said support hanger comprising:

a beam attachment section sized and configured to be engagedly positioned at an end of the beam of the sawhorse; and a saw support section comprising an elongated support member having an upper end and a lower end, a handle engaging member disposed between said upper end and said lower end and one or more saw plates at or near said lower end, said upper end of said support member attached to or integral with said beam attachment section, said handle engaging member extending outward from said support member and being sized and configured to be supportedly engaged by a top handle of the saw and each of said saw plates being sized and configured to abutting engage the saw so as to removably support the saw in a hanging position generally below the beam of the sawhorse with a rearward handle of said saw facing outwardly from said support hanger for ease of placement on or removal from said support hanger.

2. The support hanger of claim 1, wherein said beam attachment section is structured and arranged to substantially engage the end of the beam.

3. The support hanger of claim 2, wherein said beam attachment section comprises a first side plate, a second side plate and an insert component, said first side plate in spaced apart relation to said second side plate so as to define a beam opening in said beam attachment section, said beam opening sized and configured to receive part of the end of the beam therein and position said support hanger generally at the end of the beam.

4. The support hanger of claim 3, wherein the beam has a slot with an open proximal end and a closed distal end, said insert component sized and configured to be received in said slot so as to support said support hanger from the beam with the beam below the slot received into said beam opening of said beam attachment mechanism.

5. The support hanger of claim 4, wherein said beam attachment section is sized and configured to dispose a first inside surface of said first side plate in substantially abutting relation with a first side surface of the beam and a second inside surface of said second side plate in substantially abutting relation with a second side surface of the beam.

6. The support hanger of claim 5, wherein said saw support section comprises a top plate and said beam attachment section is sized and configured to dispose said top plate of said saw support section at a bottom surface of the beam so as to substantially envelope the beam below said slot.

7. The support hanger of claim 6, wherein said beam attachment section further comprises a stop component attached to or integral with at least one of said insert component, said first side plate and said second side plate, said stop component sized and configured to engage an end surface of the beam when said support hanger is supported from the beam with said insert member disposed in said slot.

8. The support hanger of claim 1, wherein said beam attachment section has an upper end, a lower end and a beam opening disposed between said upper end and said lower end of said beam attachment section, said upper end of said beam attachment section being sized and configured to be received in a slot disposed at the end of the beam so as to position part the beam below said slot in said beam opening, said lower end attached to or integral with said upper end of said support member.

9. The support hanger of claim 8, wherein said beam attachment section further comprises a stop component attached to or integral therewith, said stop component sized and configured to abut an end surface of the beam at a proximal end of said slot so as to prevent further inward movement of said insert component toward a distal end of said slot.

10. The support hanger of claim 8, wherein said beam opening is defined by an insert component at said upper end of said beam attachment section, a top plate at said upper end of said support member and a pair of spaced apart side plates disposed between said insert component and said top plate, said insert component sized and configured to be received in said slot.

11. The support hanger of claim 10, wherein said beam attachment section further comprises a stop component attached to or integral with at least one of said insert component, said top plate and said pair of side plates, said stop component sized and configured to abut an end surface of the beam at a proximal end of said slot so as to prevent further inward movement of said insert component toward a distal end of said slot.

12. A support hanger for removably supporting a saw on a beam of a support structure, said support hanger comprising:

a beam attachment section sized and configured to be engagedly positioned at an end of the beam of the support structure, said beam attachment section having an upper end, a lower end and a beam opening disposed between said upper end and said lower end, said upper end of said beam attachment section being sized and configured to engage the end of the beam and position part of the beam in said beam opening; and a saw support section comprising an elongated support member having an upper end and a lower end, a top member at said upper end of said support member, a handle engaging member disposed between said upper end and said lower end of said support member and one or more saw plates at or near said lower end of said support member, said upper end of said support member attached to or integral with said beam attachment section, said handle engaging member extending outward from said support member and being sized and configured to be supportedly engaged by a top handle of the saw and each of said saw plates being sized and configured to abutting engage the saw so as to removably support the saw in a hanging position generally below the beam of the support structure with a rearward handle of said saw facing outwardly from said support hanger for ease of placement on or removal from said support hanger.

13. The support hanger of claim 12, wherein said beam attachment section comprises a first side plate, a second side plate and an insert component, said first side plate in spaced apart relation to said second side plate so as to define said beam opening in said beam attachment section, said beam opening sized and configured to position said support hanger generally at the end of the beam.

14. The support hanger of claim 13, wherein the beam has a slot with an open proximal end and a closed distal end, said insert component sized and configured to be received in said slot so as to support said support hanger from the beam with the beam below the slot received into said beam opening of said beam attachment mechanism.

15. The support hanger of claim 14, wherein said beam attachment section is sized and configured to dispose a first inside surface of said first side plate in substantially abutting relation with a first side surface of the beam and a second inside surface of said second side plate in substantially abutting relation with a second side surface of the beam.

16. The support hanger of claim 15, wherein said saw support section comprises a top plate and said beam attachment section is sized and configured to dispose said top plate of said saw support section at a bottom surface of the beam so as to substantially envelope the beam below said slot.

17. The support hanger of claim 12, wherein said beam attachment section further comprises a stop component attached to or integral therewith, said stop component sized and configured to abut an end surface at the end of the beam so as to prevent movement of said beam attachment section away from the end of the beam.

18. A support hanger for removably supporting a saw on a beam of a support structure, said support hanger comprising:

a beam attachment section sized and configured to be engagedly positioned at an end of the beam of the support structure, said beam attachment section having an upper end, a lower end and a beam opening disposed between said upper end and said lower end, said upper end of said beam attachment section comprising an insert component sized and configured to be received in a slot at the end of the beam and position part of the beam in said beam opening; and a saw support section comprising an elongated support member having an upper end and a lower end, a top member at said upper end of said support member, a handle engaging member disposed between said upper end and said lower end of said support member and one or more saw plates at or near said lower end of said support member, said upper end of said support member attached to or integral with said beam attachment section, said handle engaging member extending outward from said support member and being sized and configured to be supportedly engaged by a top handle of the saw and each of said saw plates being sized and configured to abutting engage the saw so as to removably support the saw in a hanging position generally below the beam of the support structure with a rearward handle of said saw facing outwardly from said support hanger for ease of placement on or removal from said support hanger.

19. The support hanger of claim 18, wherein said beam attachment section further comprises a first side plate, a second side plate in spaced apart relation to said first side plate and a stop component attached to or integral with at least one of said first side plate, said second side plate and said insert component, said stop component sized and configured to abut an end surface at the end of the beam so as to prevent movement of said beam attachment section away from the end of the beam.

* * * * *